United States Patent
Kim

(10) Patent No.: US 7,389,088 B2
(45) Date of Patent: Jun. 17, 2008

(54) METHOD OF CONTROLLING SIGNAL POWER LEVEL AND A BLUETOOTH DEVICE FOR PERFORMING THE SAME

(75) Inventor: Hak-Soo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 663 days.

(21) Appl. No.: 10/832,225

(22) Filed: Apr. 26, 2004

(65) Prior Publication Data

US 2004/0242258 A1 Dec. 2, 2004

(30) Foreign Application Priority Data

Jun. 2, 2003 (KR) .................... 10-2003-0035275

(51) Int. Cl.
*H04B 5/00* (2006.01)
(52) U.S. Cl. ................ 455/41.1; 455/41.2; 455/41.3; 455/450; 455/509; 455/511; 370/337; 370/347
(58) Field of Classification Search ............. 455/41.1, 455/41.2, 41.3, 450, 509, 511; 370/337, 370/347, 349
See application file for complete search history.

(56) References Cited

U.S. PATENT DOCUMENTS

| | | | |
|---|---|---|---|
| 6,944,457 B2 * | 9/2005 | Alinikula et al. ........... 455/450 |
| 6,965,590 B1 * | 11/2005 | Schmidl et al. ............. 370/343 |
| 6,993,358 B2 * | 1/2006 | Shiotsu et al. ............ 455/552.1 |
| 7,079,516 B2 * | 7/2006 | You et al. .................... 370/337 |
| 7,142,880 B2 * | 11/2006 | Schmandt et al. .......... 455/515 |
| 2004/0032853 A1 * | 2/2004 | D'Amico et al. ........... 370/349 |

FOREIGN PATENT DOCUMENTS

| | | |
|---|---|---|
| KR | 2002-69997 | 9/2002 |
| KR | 2003-34262 | 5/2003 |
| KR | 2003-75113 | 9/2003 |

\* cited by examiner

*Primary Examiner*—Sanh D. Phu
(74) *Attorney, Agent, or Firm*—F. Chau & Assoc., LLC

(57) ABSTRACT

A method of controlling signal power level and a Bluetooth device for performing the same are provided. The method for controlling a power level of a signal to be transmitted to a remote Bluetooth device via a Bluetooth link, comprises: a local Bluetooth device for receiving a first signal from a remote Bluetooth device for determining if the remote Bluetooth device is providing a request to control a power level of the first signal to be transmitted; determining if a power level of a second signal is to be controlled based on a condition of a wireless link when the remote Bluetooth device does not provide the request to control the power level of the first signal; and controlling the power level of the second signal to be transmitted to the remote Bluetooth device.

24 Claims, 13 Drawing Sheets

METHOD OF CONTROLLING SIGNAL POWER LEVEL AND A BLUETOOTH DEVICE FOR PERFORMING THE SAME

CROSS-REFERENCE TO RELATED APPLICATIONS

This application claims priority to Korean Patent Application No. 2003-35275 filed on Jun. 2, 2003, the contents of which are incorporated herein by reference.

BACKGROUND OF THE INVENTION

1. Technical Field

The present invention relates to a method of controlling signal power level in a wireless communication system and a Bluetooth device for performing the same.

2. Discussion of the Related Art

Bluetooth is a radio communication protocol that allows electronic devices to communicate wirelessly within a short range. Bluetooth transceivers are embedded in portable devices such as mobile phones, laptop computers, MP3 players, game consoles, printers, home network devices, network access points, peripheral devices, etc., thereby enabling such devices to communicate wirelessly.

According to the Bluetooth specification version 1.0, a copy of which is herein incorporated by reference, the Bluetooth protocol has a maximum data transmission rate of 1 Mbps and a maximum transmission distance of 10 m-100 m. In addition, Bluetooth operates in a radio frequency (RF) environment (e.g., at 2.4 GHz) having a large quantity of noise.

Bluetooth uses a frequency hopping technique having a hopping rate of up to 1600 hops/sec to transmit/receive data. This frequency hopping technique divides the given frequency band into 79 hopping channels, which are separated from one another in intervals of 1 MHz (e.g., 2.402 MHz-2.480 MHz). The channels to which Bluetooth signals are allocated are switched at a high rate, such as 1600 hops/sec to reduce the effects of multi-channel interference and narrow-band impulse-based noise.

Devices used in a Bluetooth system are synchronized before communicating with each other. In particular, after Bluetooth equipped devices are synchronized via an RF link using their link managers, a communication channel is allocated from one of, for example, the 79 hopping channels, and the devices are able to communicate with each other transmitting, for example, data containing characters and voice.

The Bluetooth system typically consumes a small amount of power. Thus, portable devices such as a mobile phone are typically used in the Bluetooth system. The Bluetooth specifications define a receiver signal strength indicator (RSSI) measurement or a power control link manager protocol (LMP) message for controlling the power of signals to be transmitted in the Bluetooth system. In addition, the RSSI measurement is used to control a power level of signals transmitted from a remote Bluetooth device to a local Bluetooth device so that the local Bluetooth device can receive the signals transmitted from the remote Bluetooth device. Some Bluetooth devices, however, do not support the RSSI measurement or the power control LMP message.

According to the Bluetooth specifications, a local Bluetooth device transmits the power control LMP message only when the strength of the received signals is between a RealLowerLimit and an RSSILowerLimit or between an RSSIUpperLimit and a RealUpperLimit. The RealLowerLimit is a minimum power level limit that the local Bluetooth device may receive a packet without failure, and the RealUpperLimit is maximum power level limit that the local Bluetooth device may receive a packet without failure.

When the strength of the received signals is between the RSSILowerLimit and the RSSIUpperLimit, the local Bluetooth device does not transmit the power control LMP message to the remote Bluetooth device. Accordingly, the remote Bluetooth device maintains a previous signal power level for transmitting the signal to the local Bluetooth device.

Therefore, power dissipates when the link between Bluetooth devices is satisfactory or when two Bluetooth devices are very close to each other. In addition, interference between the Bluetooth devices within a predetermined distance increases. However, when the link between the Bluetooth devices is not satisfactory, communication channels are unnecessarily used due to signal retransmission causing an overload between the local and remote Bluetooth devices.

SUMMARY OF THE INVENTION

According to one aspect of the present invention, there is provided a method of controlling a power level of a signal to be transmitted to a communication device via a wireless link, the method comprising: i) receiving a first signal from a communication device and determining if the communication device is providing a request to control a power level of the first signal; ii) determining if a power level of a second signal is to be controlled based on a condition of a wireless link when the communication device does not provide the request to control the power level of the first signal; and iii) controlling the power level of the second signal to be transmitted to the communication device.

According to another aspect of the present invention, there is provided a method of controlling a power level of a signal to be transmitted to a remote Bluetooth device via a Bluetooth link, the method comprising: i) receiving a first signal from a remote Bluetooth device, comparing a power level of the first signal with a reference power level, and determining if the remote Bluetooth device is providing a request to control a power level of the first signal; ii) determining if a power level of a second signal is to be controlled based on a condition of a Bluetooth link when the remote Bluetooth device does not provide the request to control the power level of the first signal; and iii) controlling the power level of the second signal to be transmitted to the remote Bluetooth device.

According to yet another aspect of the present invention, there is provided a Bluetooth device comprising a control section, a baseband processing section and a transmitting-and-receiving section. The control section connects a local Bluetooth device to a remote Bluetooth device via a link, disconnects the link with the remote Bluetooth device, and controls the local Bluetooth device. The baseband processing section generates a data packet to transform the data packet into a baseband signal. The transmitting-and-receiving section transduces the baseband signal to a first signal having a frequency band by means of frequency hopping to output the first signal, receives a second signal from the remote Bluetooth device, transduces the second signal to a third signal having a baseband frequency, and transmits the third signal to the baseband processing section. The baseband processing section further comprises a power control section for determining a condition of a wireless link linked to the remote Bluetooth device to control a power level of the first signal based on the condition of the wireless link.

The power control section determines the condition of the wireless link using an ARQN bit included in a Bluetooth baseband packet header, and the ARQN bit represents a positive acknowledge (ACK) or a negative acknowledge (NAK). The power control section receives the second signal from the remote Bluetooth device, compares a power level of the second signal with a reference power level to determine if the remote Bluetooth device provides a request to control the power level of the second signal. The power control section determines if a power level of the first signal is to be controlled based on a condition of the wireless link when the remote Bluetooth device does not provide the request to control the power level of the second signal. The power control section controls the power level of the first signal for transmitting the first signal to the remote Bluetooth device.

BRIEF DESCRIPTION OF THE DRAWINGS

The features of the present invention will become more apparent by describing in detail exemplary embodiments thereof with reference to the accompanying drawings, in which.

DETAILED DESCRIPTION OF EXEMPLARY EMBODIMENTS

Figure 1:
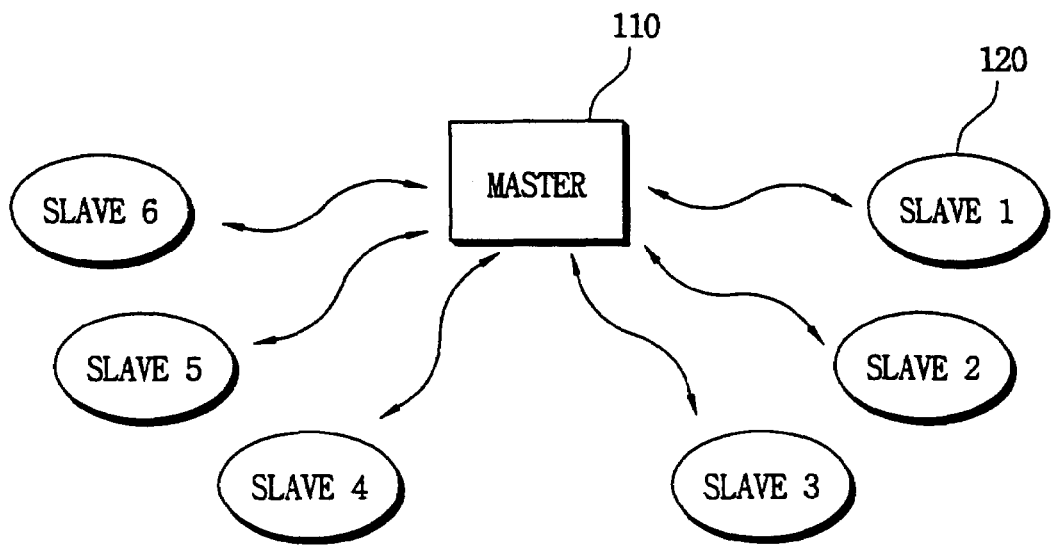
FIG. 1 illustrates a general Bluetooth network.
Figure 2:
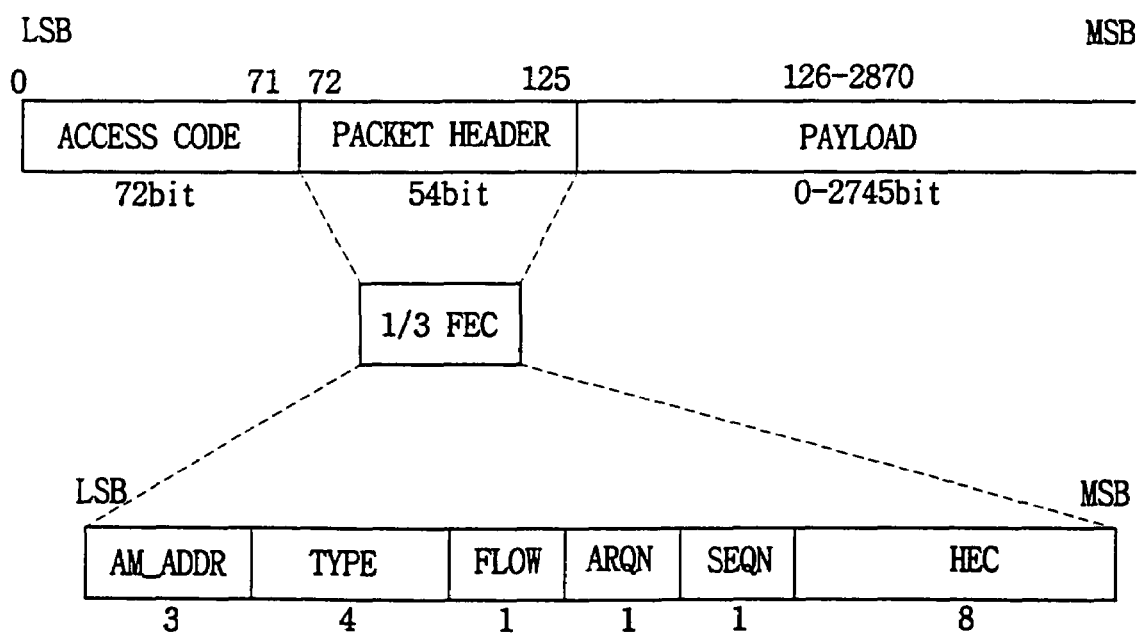
FIG. 2 illustrates a Bluetooth baseband packet.

FIG. 1 illustrates a general Bluetooth network, and FIG. 2 illustrates a Bluetooth baseband packet. Referring to FIG. 1, a master 110 is linked (e.g., coupled) to a plurality of slaves 120 (e.g., slave 1, slave 2 . . . slave 6) forming a piconet. The piconet is a part of a Bluetooth system that is formed by connecting at least one slave 120 to one master 110.

The piconet is formed when an active address (AM_ADDR) having, for example, three bits, is allocated to a slave 120 (e.g., a Bluetooth device) communicating with the master 110. Because one address of eight available addresses is used as a broadcasting address in the piconet, seven Bluetooth devices may have an active status and thus be linked to the piconet. The piconet may have one master and up to seven slaves.

The master 110 is used to manage the piconet. In particular, the master 110 determines the overall channel characteristics in the piconet, and the master 110 controls traffic in the channels. Any Bluetooth device may function as the master 110, and after the piconet is formed, the master 110 and the slave 120 may exchange their roles.

As shown in FIG. 2, the slave 120 (e.g., slave 1) is allocated the three bits of the active address AM_ADDR, receives a page message, and is synchronized with the master 110 using a frequency hopping sequence determined by the master 110.

The master 110 and the slave 120 (e.g., slave 1) carry out bilateral communication according to Time Division Duplex (TDD) in time units of 1 hopping slot of 625 µs which is equal to $\frac{1}{1600}$ second. The master 110 and the slaves 120 selectively transmit a packet via time slots. For example, the master 110 transmits the packet only in time slots designated with even numbers, and the slaves 120 transmit the packet only in time slots designated with odd numbers. The packet represents a unit of data transmitted in a piconet channel.

Referring to FIG. 2, a Bluetooth baseband packet, includes an access code, a packet header and a payload according to the Bluetooth specification version 1.1 (a copy of which is herein incorporated by reference). The access code has a fixed-length of bits, for example 72 bits, and is used to synchronize and compensate for a direct current (DC) offset. Packets that are interchanged in a piconet begin with the same access code thereby enabling a Bluetooth device in the piconet to discriminate the packet and determine which Bluetooth device the packet belongs.

The packet header has a fixed-length of bits, for example 54 bits. The packet header also includes the following: AM_ADDR , TYPE, FLOW, ARQN, SEQN and HEC. AM_ADDR includes three bits of an active address, and discriminates the slave 120 (e.g., slave 2) that has an active status from other slaves 120 (e.g., slaves 1 and 3) communicating with the master 110 in the piconet.

TYPE includes four bits and is used to discriminate sixteen types of packets. In a synchronous connection oriented (SCO) link, four control packets (e.g., NULL and POLL), HV1, HV2, HV3 and DV packets are defined. In a asynchronous connection-less (ACL) link, four control packets (e.g., NULL and POLL), AUX1, DH (Data-High rate) 1, DH 3, DH 5, DM (Data-Medium rate) 3 and DM 5 packets are defined. A NULL packet includes only an access code and a packet header. A POLL packet includes only the access code and the packet header, and is used when the master 110 polls the slaves 120.

FLOW includes one bit and is used to control the flow of packets on the ACL link. For example, when a buffer on a receiver side of a Bluetooth device overflows and runs out of space, a STOP (e.g., FLOW='1') signal is transmitted to temporarily stop data transmission.

ARQN includes one bit and is used to determine if a Cyclic Redundancy Check (CRC) packet was transmitted successfully. For example, when the CRC packet is received without failure, an ACK (e.g., positive acknowledge) signal is returned (ARQN='1'), and in the other cases NAK (e.g., negative acknowledge) signal is returned (ARQN='0').

SEQN includes one bit, maintains a previous value when the CRC packet is retransmitted to a destination terminal, and is changed when a new CRC packet is transmitted. The destination terminal compares a present SEQN with a previous SEQN ($SEQN_{OLD}$) and determines if the packet is retransmitted or if a new packet is received. HEC (Header Error Check) includes eight bits and is used to check for an error in the header. Payload has a variable length of, for example, 0-2,745 bits, which depends on the amount of data being transmitted and includes, for example, voice data.

Figure 3:
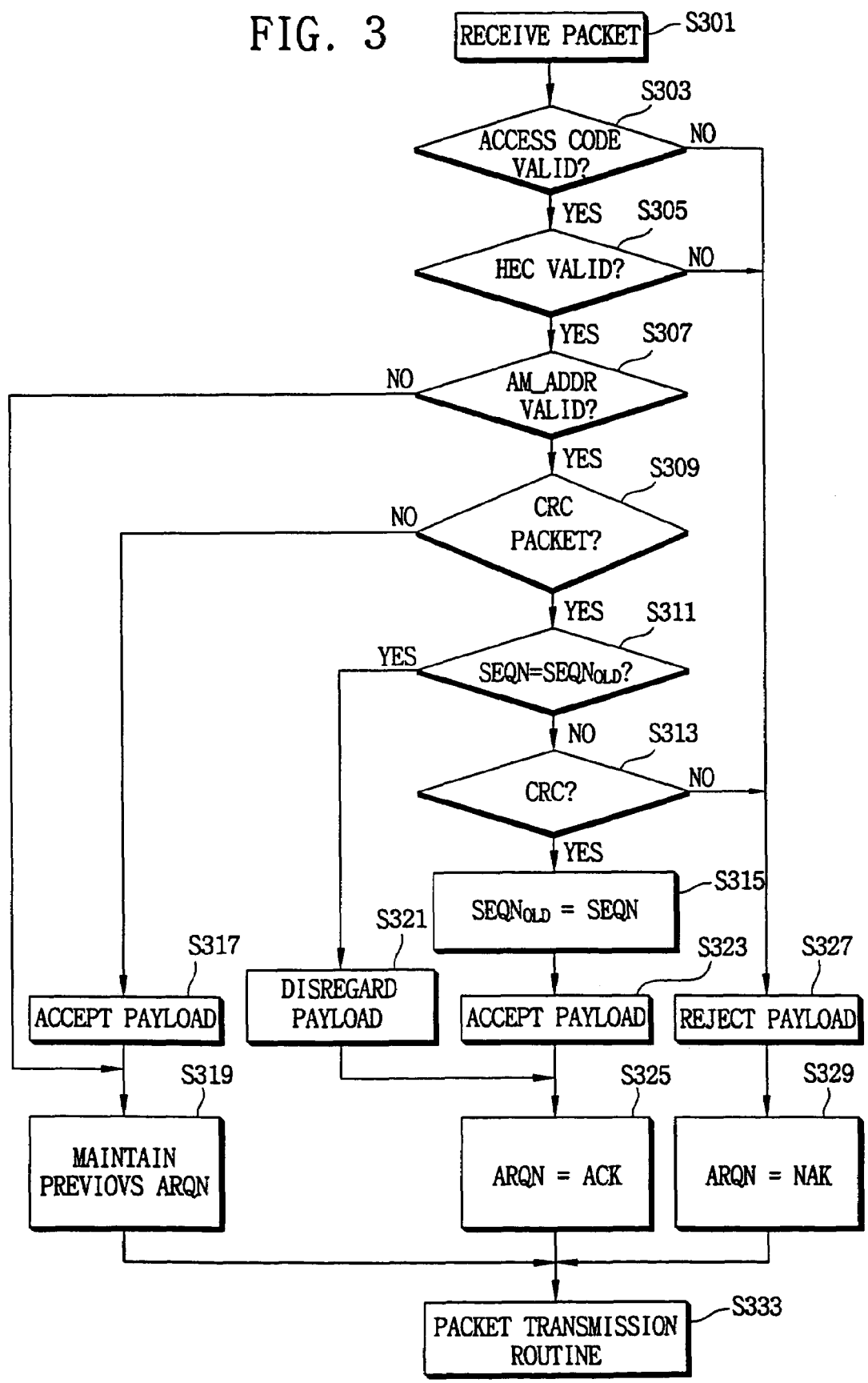
FIG. 3 is a flowchart showing a method of setting an ARQN bit according to the Bluetooth specification.

FIG. 3 is a flowchart showing a method of setting an ARQN bit according to the Bluetooth specification. When a Bluetooth device receives a packet (step S301), the validity of the access code of the header of the received packet is determined (step S303). If the access code is not valid, the payload of the received packet is rejected (step S327), and the ARQN bit is set at '0' to have the NAK status (step S329). When the access code is valid, the validity of the HEC in the header of the received packet is determined (step S305).

If the HEC is valid, the validity of the AM_ADDR is determined (step S307). When the active slave address of the AM_ADDR coincides with the address of the Bluetooth device, the AM_ADDR is valid. When the active slave address of the AM_ADDR does not coincide with the address of the Bluetooth device, present ARQN value is maintained as the previous ARQN value (step S319).

According to Bluetooth specification version 1.1, because the ARQN bit, which is determined in response to the CRC packet, is used as the ARQN value, the ARQN bit that is determined in response to the packet (e.g., AUX, HV packets), which does not have the CRC data, may not be used as the ARQN value.

In addition, in Bluetooth specification version 1.2 (a copy of which is herein incorporated by reference), an eSCO (extended Synchronous Connection Oriented) link is defined in which an ARQN scheme is applied to the EV packet transmitted through the eSCO link. In other words, the ARQN bit that is determined in response to the EV packet transmitted through the eSCO link is used as the ARQN value.

However, the ARQN bit determined in response to the EV packet is used only to increase the probability of transmission through retransmission and is not used to control the power level of signals to be transmitted. In accordance with the present invention, however, the ARQN bit is used to control the power level of signals to be transmitted. Therefore, when the active slave address of the AM_ADDR coincides with the address of the Bluetooth device, the received packet is determined to see if it includes a CRC packet (step S309).

The header TYPE of the received packet is checked to determine if the received packet includes a DM, DH or DV packet. It is then checked to determine if the received packet includes the CRC packet when the received packet includes the DM, DH or DV packets, and it is checked to determine if the received packet does not include the CRC packet when the received packet does not include the DM, DH or DV packets. In addition, the header TYPE of the received packet may also be checked to determine if the received packet includes the DM, DH or DV packets transmitted through the eSCO link to which the ARQN scheme is applied.

If the received packet does not include the CRC packet, the payload of the received packet is accepted (step S317), and the present ARQN value is maintained as the previous ARQN value (step S319). When the received packet includes the CRC packet, the present SEQN value is checked to determine if the present SEQN value is the same as the previous SEQN ($SEQN_{OLD}$) (step S311). If the present SEQN value is the same as the previous SEQN ($SEQN_{OLD}$), the payload of the received packet is disregarded (step S321) because the same packet is retransmitted, and the ARQN bit is set at '1' to have the ACK status (step S325). When the present SEQN value is not the same as the previous SEQN ($SEQN_{OLD}$), it is treated as if a new packet is received, and the validity of the CRC packet value is tested (step S313).

If the CRC packet value is valid, the previous SEQN value (e.g., $SEQN_{OLD}$) is replaced by the present SEQN value (step S315), the payload of the received packet is accepted (step S323), and the ARQN bit is set at '1' to have the ACK status (step S325). According to the Bluetooth specification, a remote Bluetooth device sets the ARQN bit as '1' (e.g., ACK status) and then sends the ACK response to a local Bluetooth device when the remote Bluetooth device receives without failure a packet from the local Bluetooth device. In addition, the remote Bluetooth device sets the ARQN bit at '0' (e.g., NAK status) and then sends a NAK signal in response to the local Bluetooth device when the remote Bluetooth device fails to receive the packet from the local Bluetooth device. The present invention controls the power level of signals to be transmitted by utilizing the ARQN bit (e.g., ACK or NAK status) in accordance with Bluetooth specification and will be discussed hereinafter in connection with FIGS. 3-16.

When the CRC packet value is not valid, the payload of the received packet is rejected (step S327) and the ARQN bit is set at '0' to have the NAK status (step S329). Subsequently, a packet transmission routine goes into a standby mode (step S333).

According to the Bluetooth specification, the RSSI measurement and the power control LMP message are defined with regard to controlling the power of signals to be transmitted. In the RSSI measurement, after the strength of a received signal is measured, the strength of the received signal is compared to reference power levels (e.g., RealUpperLimit, RealLowerLimit, RSSIUpperLimit and RSSILowerLimit), and the local Bluetooth device determines if the remote Bluetooth device should increase or decrease the power level of the signals to be transmitted. In particular, the local Bluetooth device transmits the power control LMP message only when the strength of the received signals is between the RealLowerLimit and RSSILowerLimit or between the RSSIUpperLimit and RealUpperLimit. When the strength of the received signals is between the RSSILowerLimit and RSSIUpperLimit, the local Bluetooth device does not transmit the power control LMP message to the remote Bluetooth device.

However, the Bluetooth devices do not necessarily support the RSSI measurement or power control LMP message. Thus, power control signals such as the LMP message are interpreted and filtered in the link manager (LM) of the receiver side of the Bluetooth device, and are not transferred to an upper network layer.

Figure 4:
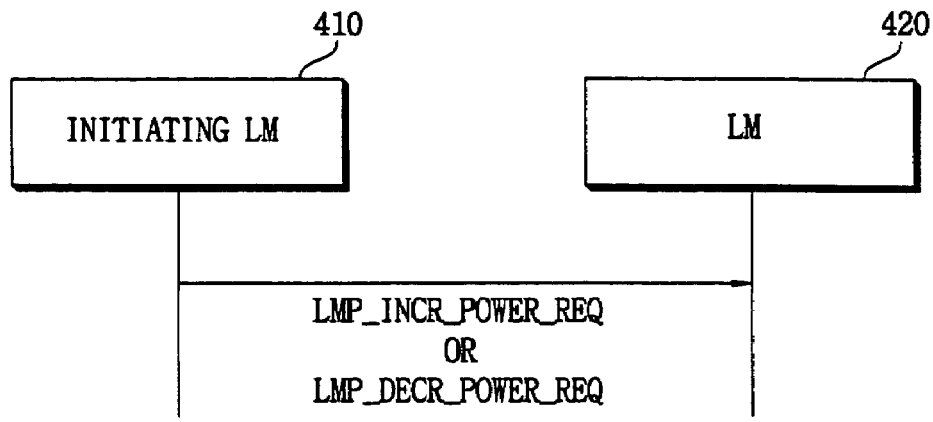
FIG. 4 illustrates a procedure for interchanging messages related to controlling a power level of signals to be transmitted according to the Bluetooth specification.

FIG. 4 illustrates a procedure for interchanging messages related to controlling a power level of signals to be transmitted according to the Bluetooth specification. Referring to FIG. 4, a transmitter side of a remote Bluetooth device, or an Initiating link manager (LM) 410 sends a LMP_INCR_POWER_REQ message to a receiver side of a local Bluetooth device, or LM 420 when the Initiating LM 410 requests the LM 420 to increase the power level of the signals to be transmitted. The Initiating LM 410 sends a LMP_DECR_POWER_REQ message to the LM 420 when the Initiating LM 410 requests the LM 420 to decrease the power level of the signals to be transmitted.

Figure 5:
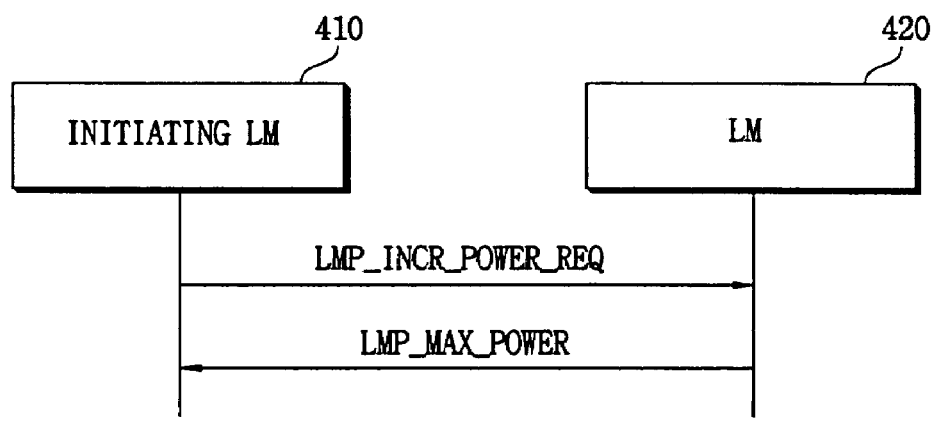
FIG. 5 illustrates another procedure for interchanging messages related to controlling the power level of signals to be transmitted according to the Bluetooth specification.

FIG. 5 illustrates another procedure for interchanging messages related to controlling the power level of signals to be transmitted according to the Bluetooth specification. Referring to FIG. 5, the receiver side of the local Bluetooth device, or LM 420 sends a LMP_MAX_POWER message to the transmitter side of the remote Bluetooth device, or the Initiating LM 410 in response to the LMP_INCR_POWER_REQ message when the receiver side of the local Bluetooth device, or the LM 420 is not able to increase the power level of the signals to be transmitted. The receiver side of the local Bluetooth device, or the LM 420 is not able to increase the power level of the signals to be transmitted when the receiver side of the remote Bluetooth device does not support the power control of the signals to be transmitted or the transmitter side of the local Bluetooth device already transmitted a signal at a maximum power level used by the receiver side of the remote Bluetooth device.

Figure 6:
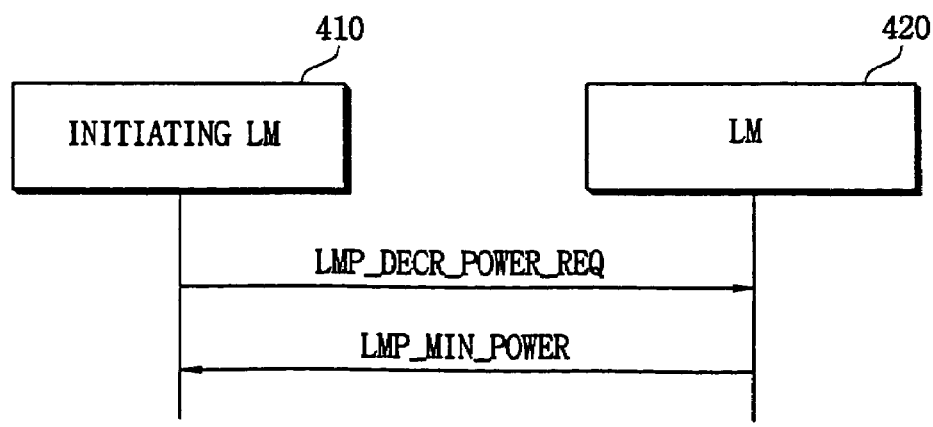
FIG. 6 illustrates yet another procedure for interchanging messages related to controlling the power level of signals to be transmitted according to the Bluetooth specification.

FIG. 6 illustrates yet another procedure for interchanging messages related to controlling the power level of signals to be transmitted according to the Bluetooth specification. Referring to FIG. 6, the receiver side of the local Bluetooth device, or the LM 420 sends a LMP_MIN_POWER message to the transmitter side of the remote Bluetooth device, or the Initiating LM 410 in response to the LMP_DECR_POWER_REQ message when the receiver side of the local Bluetooth device, or the LM 420 is not able to decrease the power level of the signals to be transmitted. The receiver side of the local Bluetooth device, or the LM 420 is not able to decrease the power level of the signals to be transmitted when the receiver side of the remote Bluetooth device does not support the power control of the signals to be transmitted or the transmitter side of the local Bluetooth device already transmitted a signal at a minimum power level used by the receiver side of the remote Bluetooth device.

Figure 7:
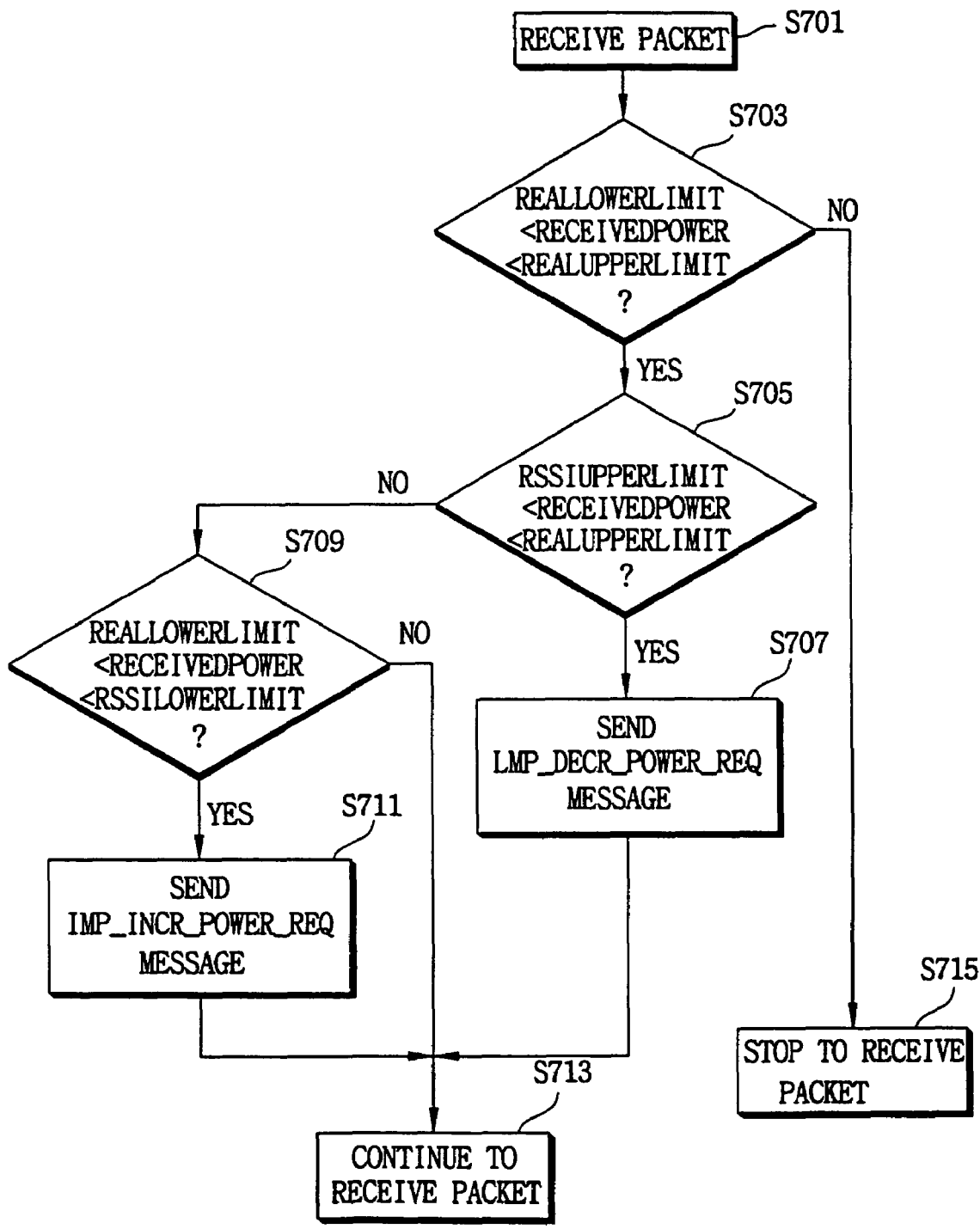
FIG. 7 is a flowchart showing a method of controlling a power level of a signal to be transmitted.
Figure 8:
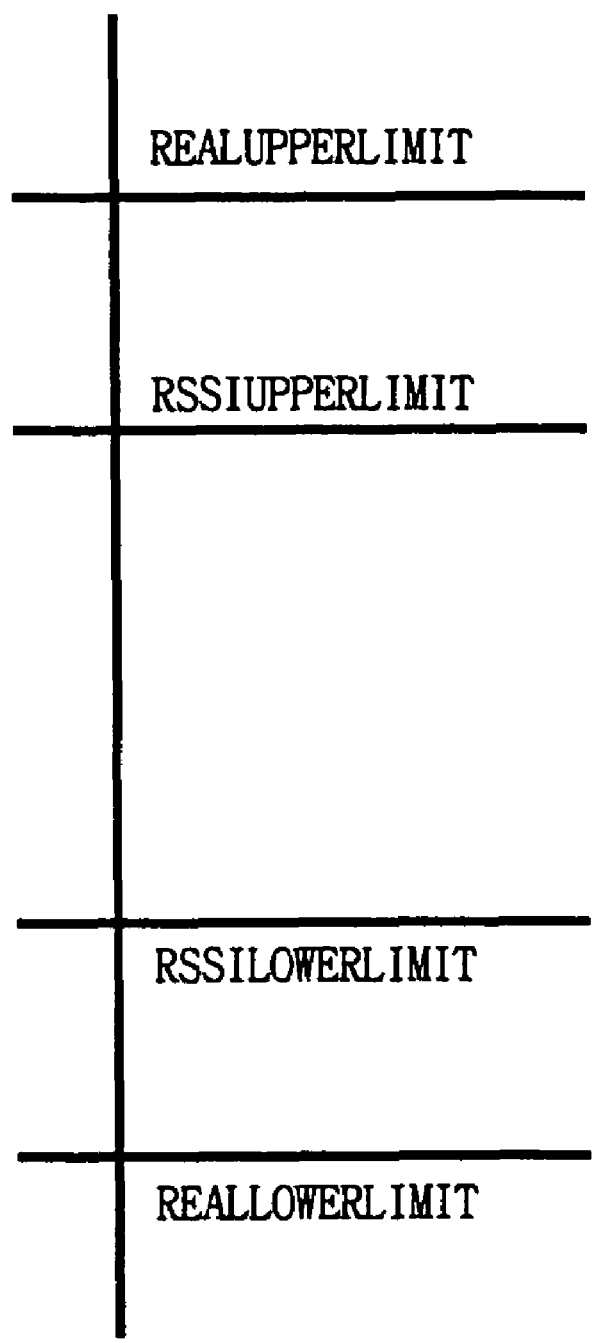
FIG. 8 illustrates power levels of received signals according to the Bluetooth specification.

FIG. 7 is a flowchart showing a method of controlling a power level of signals to be transmitted, and FIG. 8 is illustrates power levels of received signals according to the Bluetooth specification.

Referring to FIG. 7, a local Bluetooth device receives a packet (step S701) and compares the power level of the received packet (or signal) with the RealUpperLimit and the RealLowerLimit (step S703). If the power level of the received packet (or signal) is larger than or equal to the RealUpperLimit, or smaller than or equal to the RealLowerLimit, the local Bluetooth device stops to receive the packet (step S715). When the power level of the received packet is larger than the RealLowerLimit and smaller than the RealUpperLimit, the local Bluetooth device compares the power level of the received packet with the RealUpperLimit and the RSSIUpperLimit (step S705).

If the power level of the received packet is larger than the RSSIUpperLimit and smaller than the RealUpperLimit, the local Bluetooth device sends the LMP_DECR_POWER_REQ message to the remote Bluetooth device that transmitted the packet to request the remote Bluetooth device to decrease the power level of the packet (or signal) to be transmitted (step S707). When the power level of the received packet does not satisfy the condition in step S705, the local Bluetooth device compares the power level of the received packet with the RealLowerLimit and the RSSILowerLimit (step S709).

If the power level of the received packet is larger than the RealLowerLimit and smaller than the RSSILowerLimit, the local Bluetooth device sends the LMP_INCR_POWER_REQ message to the remote Bluetooth device to request the remote Bluetooth device to increase the power level of the packet (or signal) to be transmitted (step S711). When the power level of the received packet does not satisfy the conditions of steps S707 and S709, the local Bluetooth device does not send the LMP messages (LMP_DECR_POWER_REQ and LMP_INCR_POWER_REQ) to the remote Bluetooth device, thus the local Bluetooth device continues to receive packets (step S713).

The RSSI measurement enables the power level of the signals that are transmitted from the remote Bluetooth device to be controlled so that the local Bluetooth device may receive the packet transmitted from the remote Bluetooth device without failure. Therefore, the local Bluetooth device transmits the power control LMP message only when the strength of the received signal is between the RealLowerLimit and the RSSILowerLimit or between the RSSIUpperLimit and the RealUpperLimit.

It is to be understood that the RealLowerLimit is the minimum power level limit that the local Bluetooth device may receive a packet without failure, and the RealUpperLimit is the maximum power level limit that the local Bluetooth device may receive a packet without failure. Thus, when the strength of the received signal is between the RSSILowerLimit and the RSSIUpperLimit, the remote Bluetooth device maintains the power level of the received signal so that it can transmit the signal with the previous power level because the local Bluetooth device does not send the power control LMP message to the remote Bluetooth device.

Table 1 shows the RealUpperLimit, RealLowerLimit, RSSIUpperLimit and RSSILowerLimit according to the Bluetooth specification version 1.1.

TABLE 1

| Power level of received signal | Example | Range |
| --- | --- | --- |
| RealUpperLimit (actual upper sensitivity of receiver) | −20 dBm | −20 dB or more than −20 dB |
| RSSIUpperLimit (Golden Receiver Upper Power Range) | −36 dBm | RSSILowerLimit + 20 dB |
| RSSILowerLimit (Golden Receiver Lower Power Range) | −56 dBm | −56 dB~(Real LowerLimit + 6 dB) |
| RealLowerLimit (actual lower sensitivity of receiver) | −70 dBm | −70 dB or more than −70 dB |

Figure 9A:
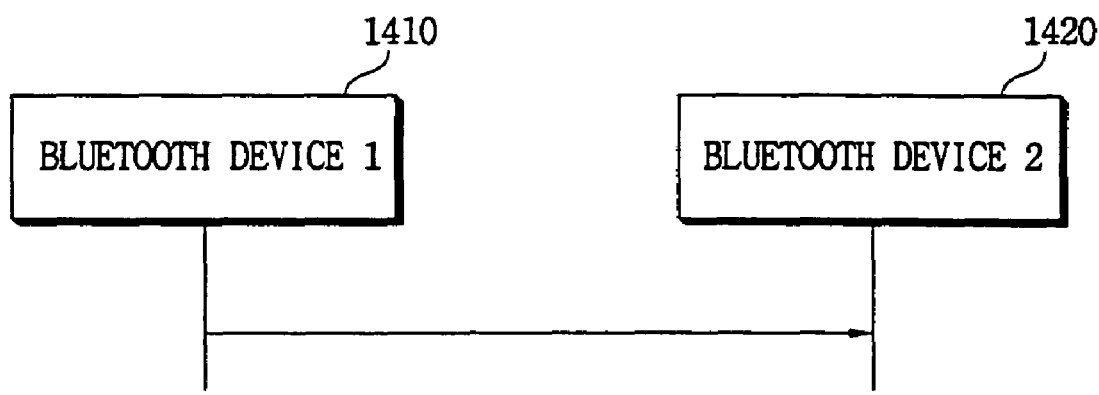
FIG. 9A illustrates signal power dissipation between Bluetooth devices.
Figure 9B:
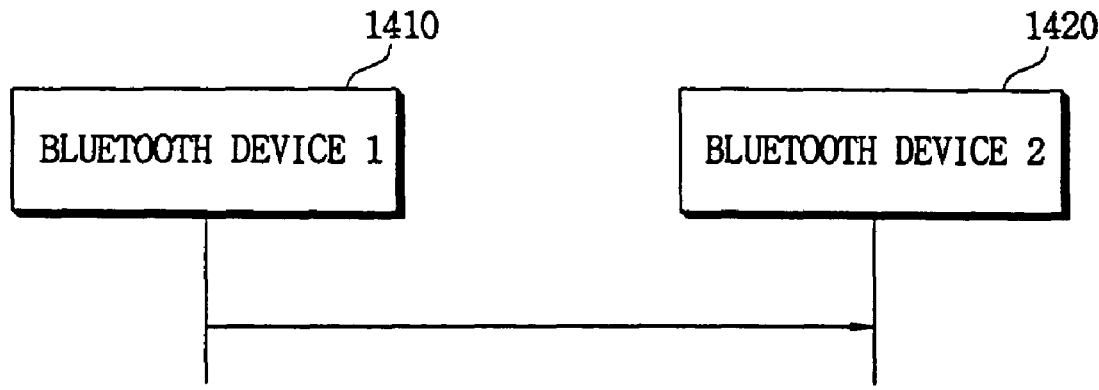
FIG. 9B also illustrates signal power dissipation between Bluetooth devices.

FIGS. 9A and 9B illustrate signal power dissipation between Bluetooth devices. Referring to FIG. 9A, when a first Bluetooth device 1410 transmits a signal having, for example, a power level of 10 dBm (or 10 mW) to a second Bluetooth device 1420, the second Bluetooth device 1420 receives a signal having a power level of −38 dBm.

According to the method of FIG. 7, because the power level (−38 dBm) of the signal received at the second Bluetooth device 1420 is above the RSSILowerLimit of Table 1 and below the RSSIUpperLimit of Table 1, the second Bluetooth device 1420 does not send the power control LMP message (LMP_DECR_POWER_REQ) to the first Bluetooth device 1410. The first Bluetooth device 1410 maintains the power level of the signal for transmitting the signal with the previous power (e.g., −38 dBm) level because the second Bluetooth device 1420 did not send the power control LMP message to the first Bluetooth device 1410.

Referring to FIG. 9B, when the Bluetooth link between the first and second Bluetooth devices 1410 and 1420 is satisfactory or when the Bluetooth devices 1410 and 1420 are very close to each other, the second Bluetooth device 1420 is able to receive the signal (or packet) without failure even when the first Bluetooth device 1410 transmits the signal having a power level of −8 dB, which is below the present power level (10 dB) by 18 dB, to the second Bluetooth device 1420. In this case, because the power level of the received signal is not less than −38 dBm−18 dBm (or −56 dBm), the second Bluetooth device 1420 does not send the power control LMP message to the first Bluetooth device 1410.

Because the second Bluetooth device 1420 is able to receive the signal without failure even though the first Bluetooth device 1410 transmits the signal having the power level of 10 dBm−18 dBm (or −8 dB or about 0.16 mW), about 10 mW−0.16 mw (or 9.84 mW) of power is dissipated.

According to the method of FIG. 7, power dissipates when the Bluetooth link between local and remote Bluetooth devices is satisfactory or when the local and remote Bluetooth devices are very close to each other. Thus, interference between the Bluetooth devices within a predetermined distance increases.

Figure 10:
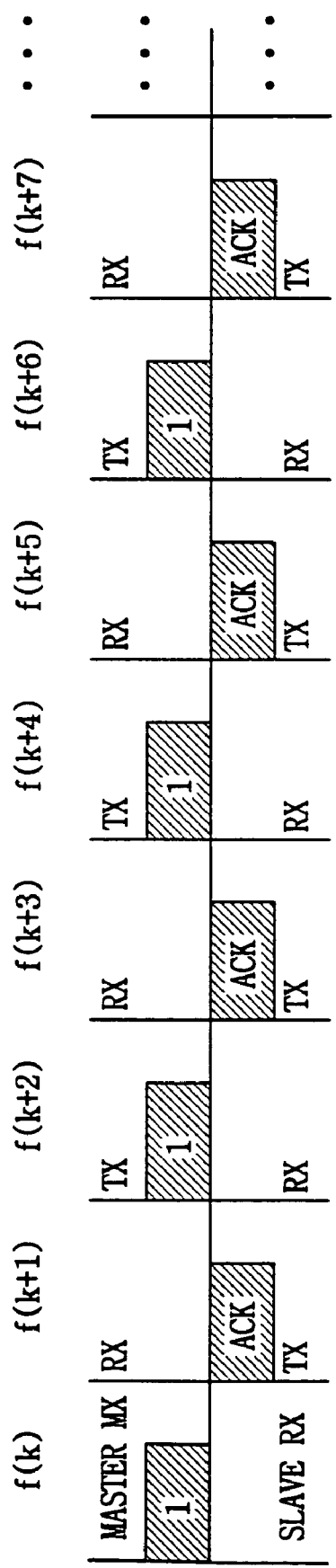
FIG. 10 illustrates packets being unnecessarily re-transmitted between Bluetooth devices.

FIG. 10 illustrates packets being unnecessarily re-transmitted between Bluetooth devices. Referring to FIG. 10, when a Bluetooth device in a master mode (Master MX) transmits a packet (I) (e.g., DM, DH, DV packets) to a Bluetooth device in a slave mode (Slave RX) and the Bluetooth link between the master and slave is not satisfactory, the master continues to transmit the packet I to the slave because the master does not receive an ACK message from the slave. Therefore, when the Bluetooth link between the local and remote Bluetooth devices is not satisfactory, channels are unnecessarily used and the Bluetooth devices may overload due to the retransmission of packets.

According to the present invention, in the above case, when the slave increases the power level of the signal by a predetermined size to transmit to the master, the probability that the master receives the signal without error increases, and unnecessary channel use due to the retransmission of packets is prevented. In addition, overload, which occurs when the master and slave respectively transmit packets and receive packets repeatedly, at the master and slave is prevented and will be discussed in detail in connection with FIGS. 11-16.

Figure 11:
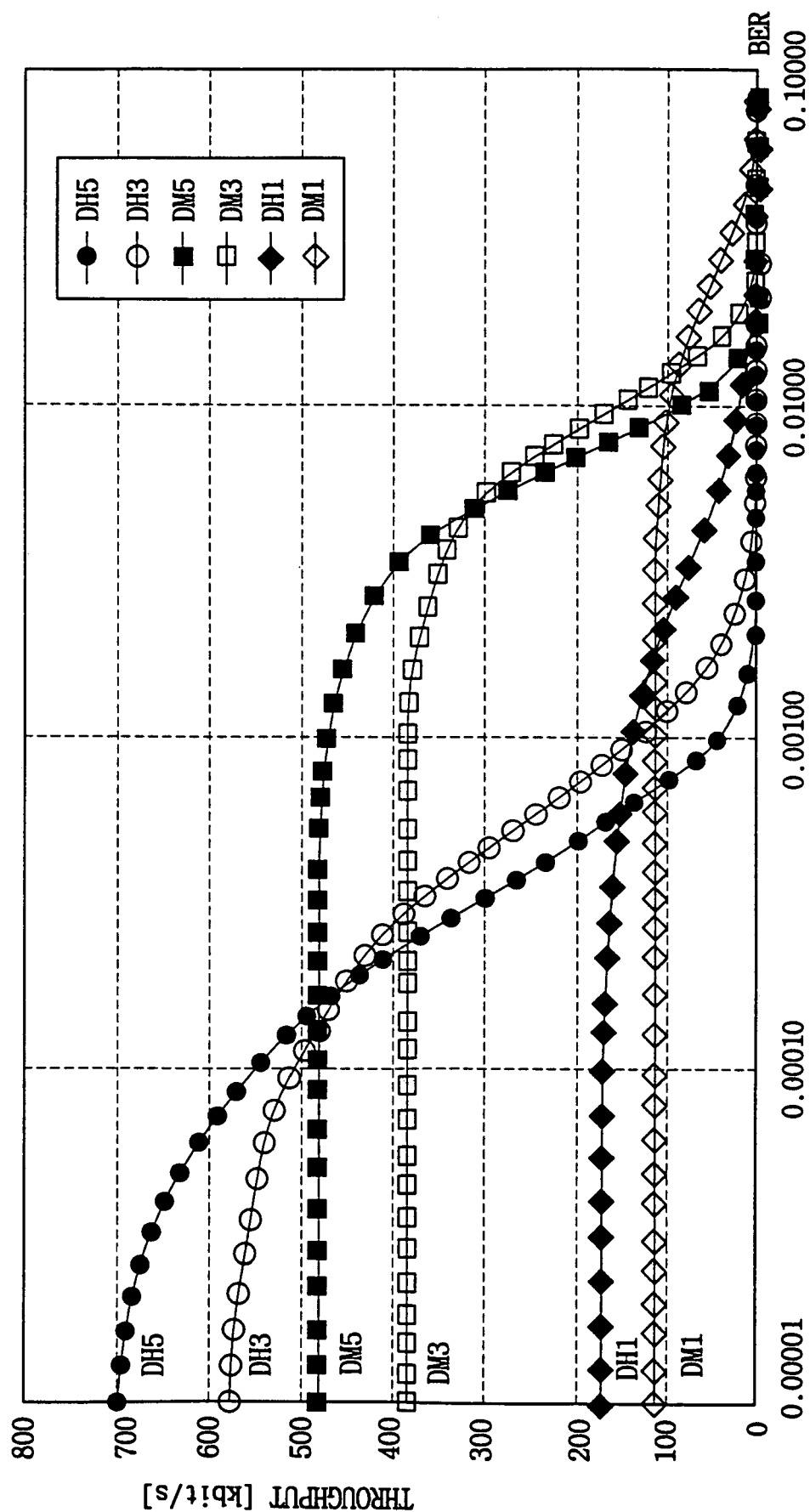
FIG. 11 is a graph showing throughput versus Bit-Error-Rate (BER) for a variety of packets.

FIG. 11 is a graph showing throughput versus Bit-Error-Rate (BER) for a variety of packets. The graph of FIG. 11 is shown in FIG. 1 of the paper entitled "A Novel Channel Modeling Technique for Performance of Bluetooth Baseband Packets" (IEEE International Conference on Communications, Volume 1, April 2002), a copy of which is herein incorporated by reference.

Referring to FIG. 11, the throughput of high speed packets DH (Data-High rate) 3 and DH 5 abruptly decreases as the BER increases. The throughput of medium speed packets DM (Data-Medium rate) 3 and DM 5 abruptly decreases when the BER is more than 0.1%. Therefore, the power level of signals are increased so as to increase the BER and to enhance the throughput of packets.

Figure 12:
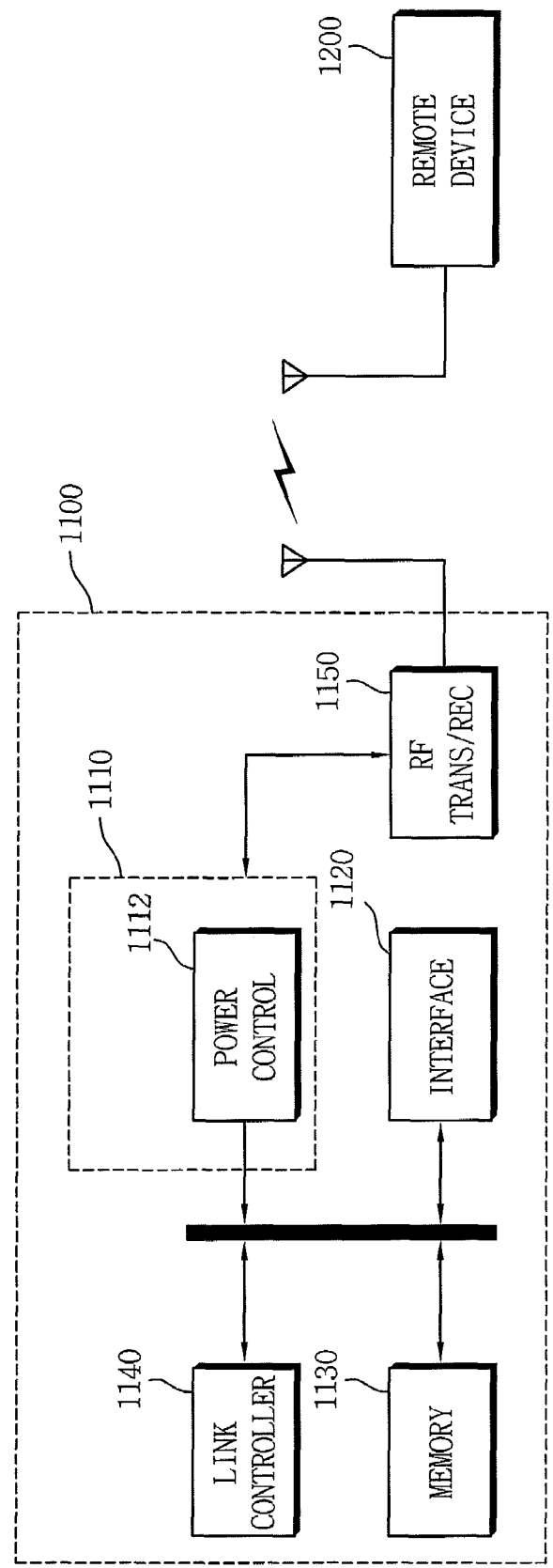
FIG. 12 is a block diagram showing a Bluetooth system according to an exemplary embodiment of the present invention.
Figure 13:
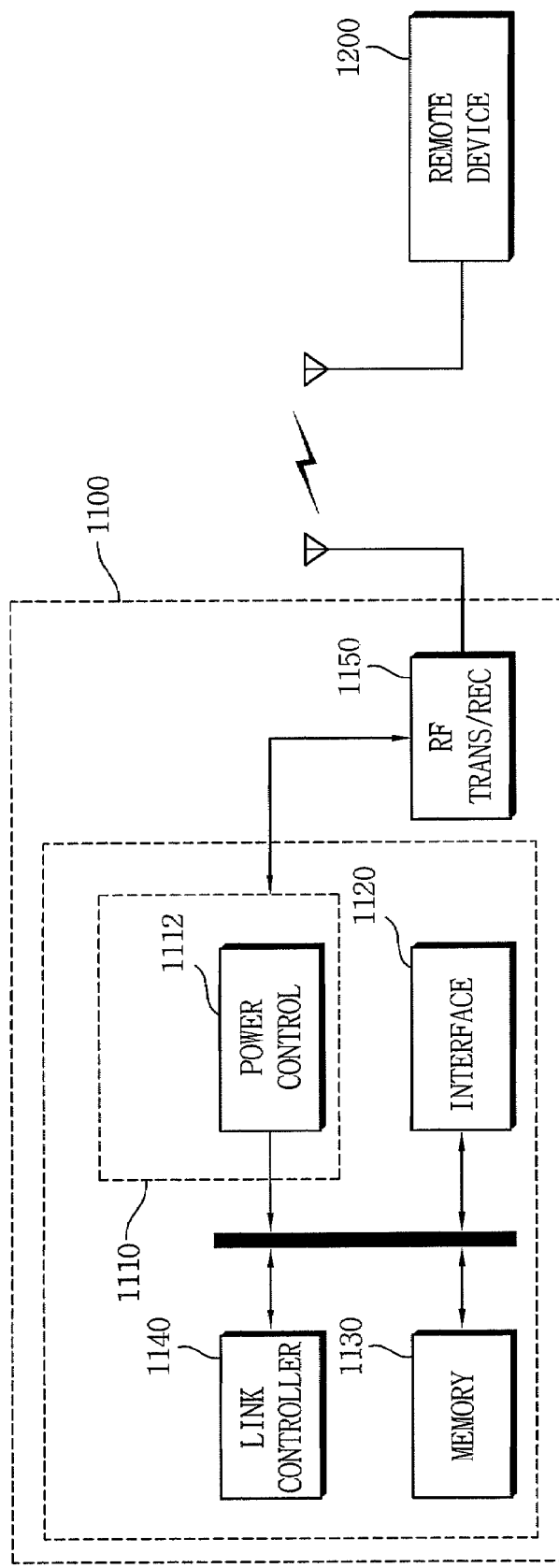
FIG. 13 is a block diagram showing a Bluetooth system according to another exemplary embodiment of the present invention.

FIG. 12 is a block diagram showing a Bluetooth system according to an exemplary embodiment of the present invention, and FIG. 13 is a block diagram showing a Bluetooth system according to another exemplary embodiment of the present invention.

Referring to FIG. 12, the Bluetooth system includes a local Bluetooth device 1100 and a remote Bluetooth device 1200. The local Bluetooth device 1100 includes a baseband processing section 1110, a control section 1140, a memory section 1130, an interfacing section 1120 and an RF transmitting-and-receiving section 1150. The Bluetooth system supports one-to-one link and one-to-multi link cases.

The baseband processing section 1110 includes a power control section 1112. The power control section 1112 determines a condition of a Bluetooth link and controls a power level of the signals to be transmitted based on the condition of the Bluetooth link. The control section 1140 connects a link with the remote Bluetooth device 1200, disconnects the link with the remote Bluetooth device 1200, and controls overall operation of the local Bluetooth device 1100. The memory section 1130 stores a control program for running the control section 1140 and stores temporary data that is generated while the control program is running.

The baseband processing section 1110 receives data from the control section 1140, encodes and encrypts the received data. The baseband processing section 1110 generates a data packet for wireless communication and transforms the data packet into baseband analog signal.

The RF transmitting-and-receiving section 1150 transduces the baseband signal to a signal having a frequency band determined by means of a frequency hopping method, amplifies the signal and transmits the amplified signal through an antenna. The RF transmitting-and-receiving section 1150 receives an input signal through the Bluetooth link, transduces the input signal to a baseband signal, and transmits the baseband signal to the baseband processing section 1110. The interfacing section 1120 includes, for example, a timer, a GPIO (General Purpose Input Output) device and a UART (Universal Asynchronous Receiver-Transmitter). The interfacing section 1120 is used to interface with external devices.

It is to be understood that the baseband processing section 1110 and the RF transmitting-and-receiving section 1150 may be embodied in one chip as shown in FIG. 12, or in two chips as shown in FIG. 13.

Figure 14:
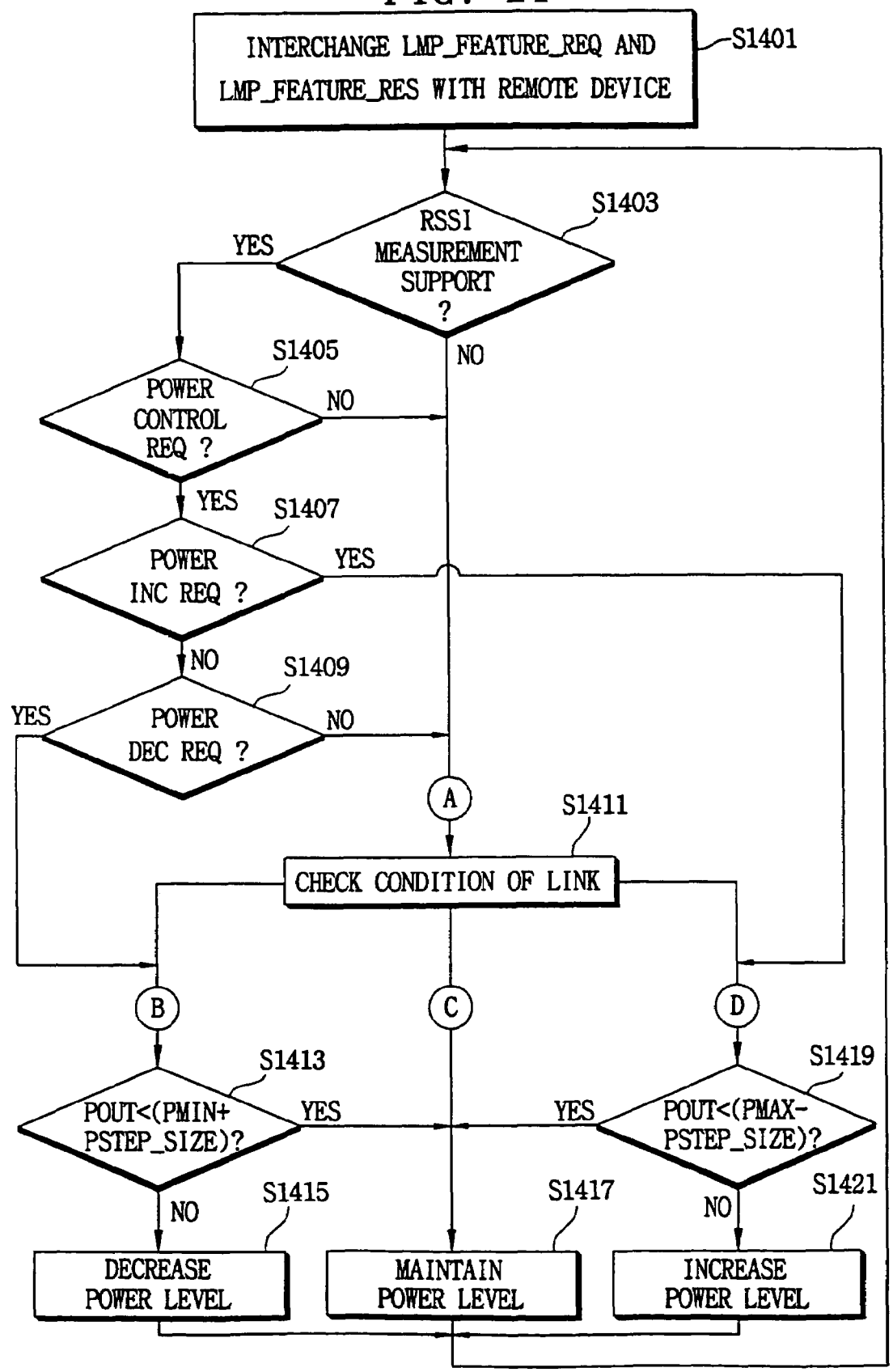
FIG. 14 is a flowchart showing a method for controlling a power level of signals to be transmitted based on a condition of a Bluetooth link according to an exemplary embodiment of the present invention.
Figure 15:
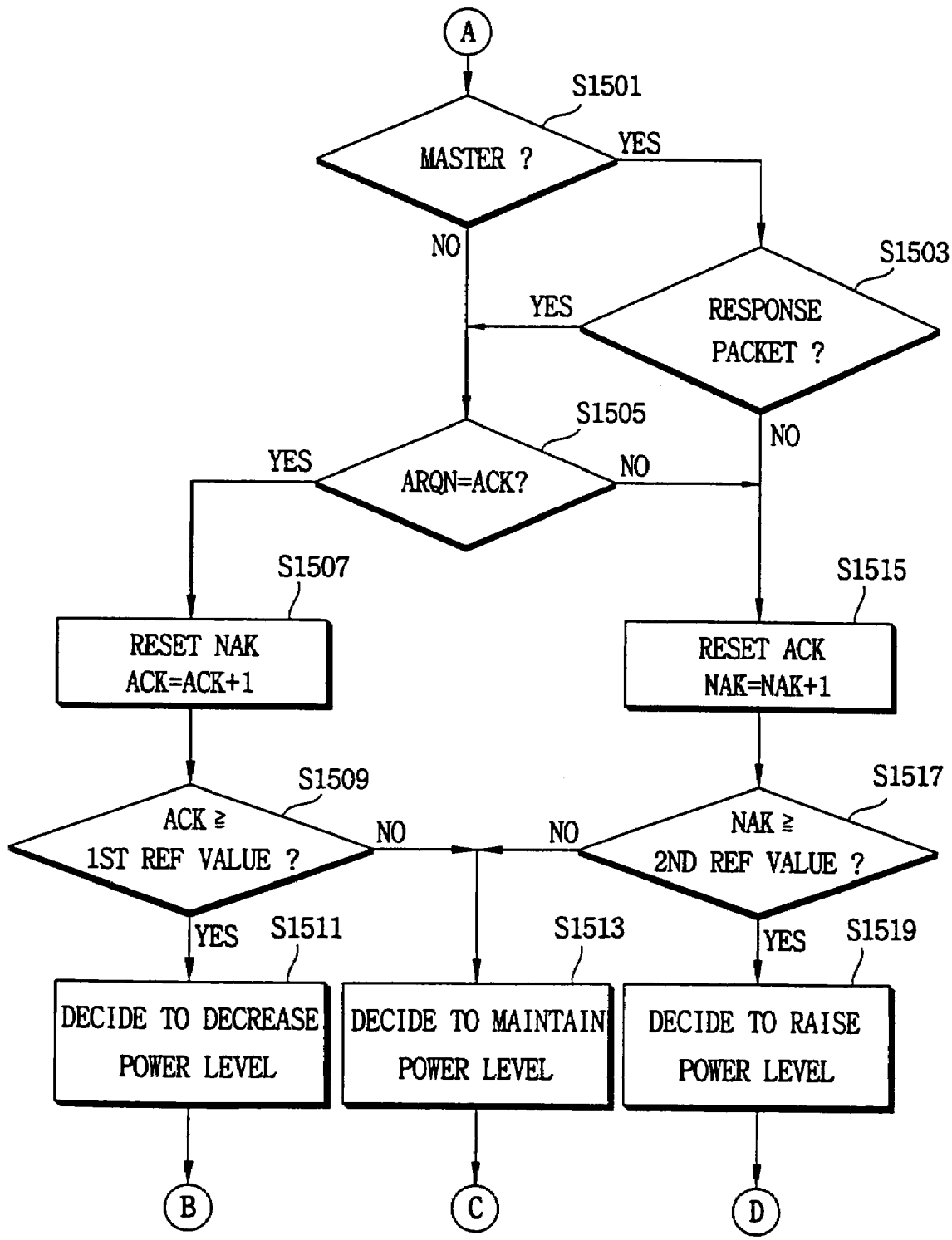
FIG. 15 is a flowchart showing a method for determining the condition of the Bluetooth link according to an exemplary embodiment of the present invention.

FIG. 14 is a flowchart showing a method for controlling a power level of signals to be transmitted based on a condition of a Bluetooth link according to an exemplary embodiment of the present invention. FIG. 15 is a flowchart showing a method for determining the condition of the Bluetooth link according to another exemplary embodiment of the present invention.

Referring to FIG. 14, a local Bluetooth device interchanges a link manager protocol feature request message (LMP_FEATURE_REQ) and a link manager protocol feature response message (LMP_FEATURE_RES) with a remote Bluetooth device to verify what features the remote Bluetooth device supports (step S1401). The LMP_FEATURES_RES message has information related to whether the remote Bluetooth device supports an RSSI (Receiver Signal Strength Indicator) measurement. According to the Bluetooth specification version 1.1, the LMP_FEATURES_RES message has eight bytes, the second byte of the LMP_FEATURES_RES message has information related to whether the remote Bluetooth device supports the RSSI measurement, and one bit of the third byte of the LMP_FEATURES_RES message has information related to whether the remote Bluetooth device supports transmission power control.

The local Bluetooth device determines if the remote Bluetooth device supports the RSSI measurement using the LMP_FEATURES_REQ message and the LMP_FEATURES_RES message (step S1403). If the RSSI measurement is supported by the remote Bluetooth device, the local Bluetooth device determines if a power control request message is received from the remote Bluetooth device (step S1405). If the RSSI measurement is not supported by the remote Bluetooth device, the local Bluetooth device checks the condition of the present Bluetooth link (step S1411). When the power control request message is not received from the remote Bluetooth device, the local Bluetooth device also checks the condition of the present Bluetooth link (step S1411). According to the Bluetooth specification version 1.1, the power control request message includes the LMP_INCR_POWER_REQ, LMP_DECR_POWER_REQ, and LMP_MAX_POWER_REQ messages.

When the power control request message is received from the remote Bluetooth device, the local Bluetooth device determines if the power control request message corresponds to a power control increase request message (LMP_INCR_POWER_REQ) (step S1405). When the power control request message corresponds to the LMP_INCR_POWER_REQ message, the local Bluetooth device determines if the power level of signals is to be increased or not (step S1407). When the power control request message corresponds to the LMP_DECR_POWER_ REQ message, the local Bluetooth device determines if the power level of signals is to be decreased or not (step S1409). If the power control request message does not correspond to the LMP_DECR_POWER_REQ message, the local Bluetooth device checks the condition of the present Bluetooth link (step S1411).

The local Bluetooth device determines if the present power level (Pout) of the signal to be transmitted is larger than (Pmax−Pstep_size) (step S1419). Pmax is a maximum power level by which the corresponding Bluetooth device is able to transmit a signal. In other words, the corresponding Bluetooth device is not able to transmit a signal having a power level larger than the Pmax. Pout is the present power level of the signal to be transmitted. Pstep_size is a power step size. Thus, a Bluetooth device increases or decreases the power level of a signal to be transmitted by the Pstep_size. For example, the Pstep_size is in a range from approximately 2 dB to approximately 8 dB, and the Pstep_size may be a constant or a variable.

When the present power level (Pout) is not larger than (Pmax−Pstep_size), the local Bluetooth device increases the power level of the signal to be transmitted by the Pstep_size (step S1421). When the present power level (Pout) is larger than (Pmax−Pstep_size), the local Bluetooth device maintains the power level of the signal to be transmitted (step S1417).

The local Bluetooth device determines if the present power level (Pout) is smaller than (Pmin+Pstep_size) (step S1413). Pmin is a minimum power level by which the corresponding Bluetooth device is able to transmit a signal. In other words, the corresponding Bluetooth device is not able to transmit a signal having a power level smaller than the Pmin. The Pstep_size by which the power level of signal is increased may be the same as or different from the Pstep_size by which the power level of signal is decreased.

When the present power level (Pout) is not smaller than (Pmin+Pstep_size), the local Bluetooth device decreases the power level of the signal to be transmitted by the Pstep_size (step S1415). When the present power level (Pout) is smaller than (Pmin+Pstep_size), the local Bluetooth device maintains the power level of the signal to be transmitted (step S1417). The Pstep_size may be a constant or a variable.

It is to be understood that the above steps S1403-S1421 are performed in each of time slots (e.g., as shown in FIG. 10) on the receiver side of the Bluetooth device. The process in which the condition of the Bluetooth link is determined will now be discussed with reference to FIG. 15.

Referring to FIG. 15, a local Bluetooth device determines if the local Bluetooth device is in a master mode or in a slave mode (step S1501). If the local Bluetooth device is in a master mode, the local Bluetooth device determines if a response packet is received from a Bluetooth device in the slave mode to which the master transmits a packet via a previous time slot (step S1503). When the response packet such as a NULL packet or a DATA packet is not received from the slave Bluetooth device to which the master transmits a packet via the previous time slot, the local Bluetooth device concludes that the ARQN bit has the NAK status and performs step S1515 to be discussed below. When the response packet is not received from the slave Bluetooth device, the local Bluetooth device performs step S1505 in which the local Bluetooth device determines if the ARQN bit has the ACK status or not.

It is to be understood that the above power control method may be executed in a baseband layer or in a link manager layer of a local or remote Bluetooth device. In addition, some steps may be executed in the baseband layer, and the other steps may be executed in the link manager layer.

As shown in FIG. 15, when the local Bluetooth device is in a slave mode, the local Bluetooth device determines if the ARQN bit has the ACK status (step S1505). If the ARQN bit has the ACK status, the local Bluetooth device resets a count of the NAK to zero, increases a count of the ACK by one (step S1507), and compares the count of the ACK with a first reference value to determine if the power level of the signal to be transmitted is to be decreased (step S1509). When the count of the ACK is more than or equal to the first reference value, the local Bluetooth device decides that the power level of the signal may be decreased (step S1511) and performs step S1415 of FIG. 14. When the count of the ACK is less than the first reference value, the local Bluetooth device decides that the power level of the signal is to be maintained (step S1513) and performs step S1417 of FIG. 14.

When the ARQN bit does not have the ACK status, or the NAK status, the local Bluetooth device resets the count of the ACK to zero, increases the count of the NAK by one (step S1515), and compares the count of the NAK with a second reference value to determine if the power level of the signal to be transmitted is to be increased (step S1517). When the count of the NAK is more than or equal to the second reference value, the local Bluetooth device decides that the power level of the signal may be increased (step S1519) and performs step S1421 of FIG. 14. When the count of the NAK is less than the second reference value, the local Bluetooth device decides that the power level of the signal is to be maintained (step S1513) and performs step S1417 of FIG. 14.

It is to be further understood that the first and second reference values may vary depending on the power control method employed in accordance with the present invention. The first and second reference values are determined according to reasonable degrees to which the power level of the signal may be increased or decreased.

In addition, the master Bluetooth device may individually (by itself) adopt the above mentioned power control method for each of the slave Bluetooth devices and the master Bluetooth device may adopt various power control methods in light of the power control methods employed by the slave Bluetooth devices.

Figure 16:
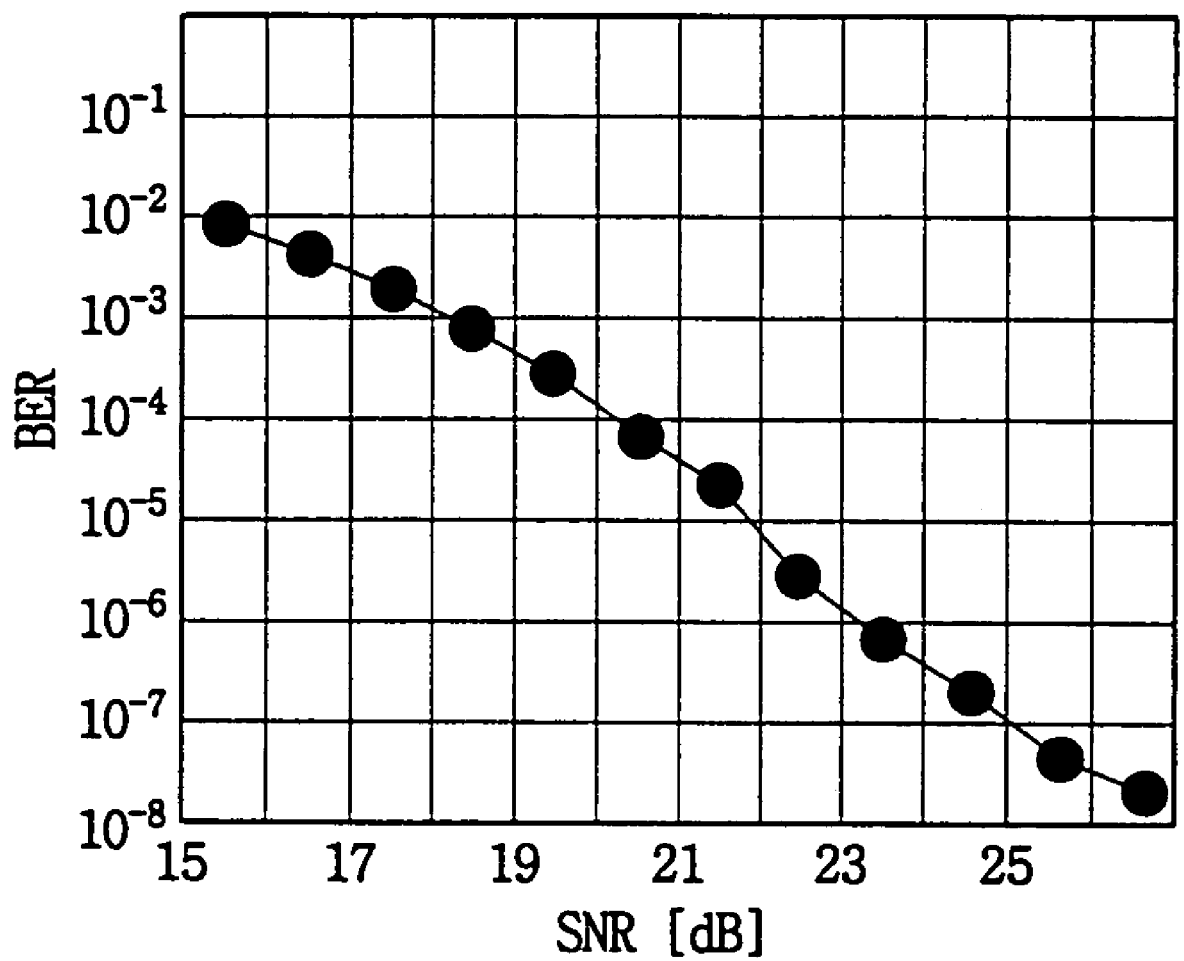
FIG. 16 is a graph showing BER versus Signal-to-Noise Ratio (SNR) under additive white Gaussian noise (AWGN).

FIG. 16 is a graph showing Bit-Error-Rate (BER) versus Signal-to-Noise Ration (SNR) under additive white Gaussian noise (AWGN). Referring to FIG. 16, the BER decreases under AWGN as the SNR increases. The effect of the power control method of the present invention based on the condition of a Bluetooth link manager protocol will be described with reference to FIG. 16.

When the receiver side of a local Bluetooth device is in an environment in which noises and interferences minimally affect the receiver side of the local Bluetooth device or when the receiver side of the local Bluetooth device is very close to a remote Bluetooth device, the SNR is high when compared to a normal operating environment in which noises and interferences affect the receiver side of the local Bluetooth device, so that the BER is relatively low as shown in FIG. 16.

Accordingly, when the receiver side of the local Bluetooth device receives a baseband packet, the error rate is low enough so that the probability of the NAK response is low. Therefore, when the remote Bluetooth device lowers the power level of the signal by a small value and transmits the signal with the lowered power level, the SNR is satisfactory, and the receiver side of the local Bluetooth device receives a baseband packet without failure and the interferences are reduced.

When the receiver side of the local Bluetooth device is in an environment in which noises and interferences greatly affect the receiver side of the local Bluetooth device or when the receiver side of the local Bluetooth device is very far from the remote Bluetooth device, the SNR is low as compared to that of a normal operating environment in which noises and interferences affect the receiver side Bluetooth device, so that the BER is relatively low as shown in FIG. 16.

Accordingly, when the receiver side Bluetooth device receives a baseband packet, the error rate is high enough so that the probability of the NAK response is high. Therefore, when the remote Bluetooth device raises the power level of the signal by a small value and transmits the signal with the raised power level, the retransmission induced by the decrease of the BER (due to the increase of the SNR) may be reduced, and overload due to the decrease of the BER is reduced.

According to power control method of the present invention, the power level of a signal to be transmitted is controlled based on the condition of a wireless or Bluetooth link between two Bluetooth devices (e.g., local and remote Bluetooth devices). For example, when the condition of the Bluetooth link is satisfactory (e.g., the Bluetooth devices are in a close range to each other), a transmitting side of the local Bluetooth device lowers the power level of a signal to be transmitted so that the receiver side of the remote Bluetooth device may receive a packet without failure and transmits the signal having the lowered power level. Thus, the power consumption of the remote Bluetooth device is reduced, and the interferences between the two Bluetooth devices is reduced.

In addition, when the condition of the Bluetooth link is not satisfactory (e.g., the devices are not in a close range to each other), the transmitting side of the local Bluetooth device raises the power level of the signal so that the receiver side of the remote Bluetooth device can receive a packet without failure and transmits the signal with the raised power level. Thus, channels are not unnecessarily used due to re-transmission and overloads between the two Bluetooth devices is reduced.

While the present invention has been particularly shown and described with reference to exemplary embodiments thereof, it should be understood by those of ordinary skill in the art that various changes, substitutions and alterations can be made herein without departing from the scope of the invention as defined by appended claims and their equivalents.

What is claimed is:

1. A method of controlling a power level of a signal to be transmitted to a communication device via a wireless link, the method comprising:
    receiving a first signal from a communication device for determining if the communication device is providing a request to control a power level of the first signal;
    determining if a power level of a second signal is to be controlled based on a condition of a wireless link when the communication device does not provide the request to control the power level of the first signal; and
    controlling the power level of the second signal to be transmitted to the communication device.

2. The method of claim 1, wherein the step of determining if the communication device is providing the request to control the power level of the first signal, comprises:
    interchanging a request message and a response message with the communication device, wherein the response message identifies if the communication device supports an RSSI (Receiver Signal Strength Indicator) measurement; and
    determining if the communication device provides the request to control the power level of the first signal based on the response message.

3. The method of claim 1, wherein the request message and the response message are transmitted in accordance with a Bluetooth specification.

4. The method of claim 3, wherein the request message is a link manager protocol feature request message and the response message is a link manager protocol feature response message.

5. The method of claim 1, wherein the condition of the wireless link is determined by an ARQN bit in a Bluetooth baseband packet header, wherein the ARQN bit represents one of a positive acknowledge (ACK) and a negative acknowledge (NAK).

6. The method of claim 5, wherein the step of determining if the power level of the second signal is to be controlled, comprises:
    determining if the ARQN bit is the ACK or the NAK;
    resetting a count of the NAK to zero, increasing a count of the ACK by one, and comparing the count of the ACK with a first reference value to determine if the power level of the second signal is to be decreased, when the ARQN bit is the ACK; and
    resetting the count of the ACK to zero, increasing the count of the NAK by one, and comparing the count of the NAK with a second reference value to determine if the power level of the second signal is to be increased, when the ARQN bit is the NAK.

7. The method of claim 6, wherein the power level of the second signal is decreased when the count of the ACK is more than the first reference value, and the power level of the second signal is increased when the count of the NAK is more than the second reference value.

8. The method of claim 6, wherein the step, of determining if the power level of the second signal is to be controlled, further comprises:

maintaining the power level of the second signal when the count of the ACK is less than or equal to the first reference value or when the count of the NAK is less than or equal to the second reference value.

9. The method of claim 8, wherein the step of controlling the power level of the second signal to be transmitted to the communication device, comprises:

increasing the power level of the second signal by a first step size to transmit the second signal to the communication device when the power level of the second signal is to be increased;

decreasing the power level of the second signal by the first step size to transmit the second signal to the communication device when the power level of the second signal is to be decreased; and maintaining the power level of the second signal to transmit the second signal to the communication device when the power level of the second signal is to be maintained.

10. The method of claim 6, wherein the step of determining if the power level of the second signal is to be controlled, further comprises:

determining if a mode is a master mode or a slave mode;

determining if a status is the ACK or the NAK when the mode is the slave mode;

determining if a response packet is received from a communication device in the slave mode when the mode is the master mode, wherein the response packet is a response to a packet sent to the communication device in the slave mode via a previous time slot;

determining if the status is the ACK or the NAK when the response packet is received from the communication device in the slave mode; and deciding that the ARQN bit represents the NAK when the response packet is not received from a communication device in the slave mode, and determining if the power level of the second signal is to be increased.

11. The method of claim 1, further comprising:

determining if a power control request message is received from the communication device when the communication device provides the request for controlling the power level of the first signal.

12. The method of claim 11, further comprising:

determining if the power control request message corresponds to a power control increase request message or a power control decrease request message when the power control request message is received from the communication device.

13. The method of claim 12, further comprising:

maintaining the power level of the second signal to transmit the second signal to the communication device when the power control request message corresponds to the power control increase request message and the power level of the second signal added to the first step size is more than a maximum power level;

increasing the power level of the second signal by the first step size to transmit the second signal to the communication device when the power control request message corresponds to the power control increase request message and the power level of the second signal added to the first step size is less than or equal to a maximum power level;

maintaining the power level of the second signal to transmit the second signal to the communication device when the power control request message corresponds to the power control decrease request message and the power level of the second signal subtracted by the second step size is less than a minimum power level; and decreasing the power level of the second signal by the second step size to transmit the second signal to the communication device when the power control request message corresponds to the power control decrease request message and the power level of the second signal subtracted by the second step size is less than or equal to a minimum power level.

14. The method of claim 13, further comprising:

determining if the power level of the second signal is to be controlled based on the condition of the wireless link when the power control request message does not correspond to the power control increase request message or the power control decrease request message.

15. The method of claim 13, further comprising:

increasing the power level of the second signal by the first step size to transmit the second signal to the communication device when the power control request message corresponds to the power control increase request message; and decreasing the power level of the second signal by the second step size to transmit the second signal to the communication device when the power control request message corresponds to the power control decrease request message.

16. A method of controlling a power level of a signal to be transmitted to a remote Bluetooth device via a Bluetooth link, the method comprising:

receiving a first signal from a remote Bluetooth device, comparing a power level of the first signal with a reference power level, and determining if the remote Bluetooth device is providing a request to control a power level of the first signal;

determining if a power level of a second signal is to be controlled based on a condition of a Bluetooth link when the remote Bluetooth device does not provide the request to control the power level of the first signal; and controlling the power level of the second signal to be transmitted to the remote Bluetooth device.

17. The method of claim 16, wherein the step of determining if the remote Bluetooth device is providing the request to control the power level of the first signal, comprises:

interchanging a request message and a response message with the remote Bluetooth device, wherein the response message identifies if the remote Bluetooth device supports an RSSI (Receiver Signal Strength Indicator) measurement; and determining if the communication device provides the request to control the power level of the first signal based on the response message.

18. The method of claim 17, wherein the step of determining if the power level of the second signal is to be controlled, comprises:
- determining if the ARQN bit represents a positive acknowledge (ACK) or a negative acknowledge (NAK);
- resetting a count of the NAK to zero, increasing a count of the ACK by one, and comparing the count of the ACK with a first reference value to determine if the power level of the second signal is to be decreased, when the ARQN bit is the ACK; and
- resetting the count of the ACK to zero, increasing the count of the NAK by one, and comparing the count of the NAK with a second reference value to determine if the power level of the second signal is to be increased, when the ARQN bit is the NAK.

19. The method of claim 18, wherein the power level of the second signal is decreased when the count of the ACK is more than the first reference value, and the power level of the second signal is increased when the count of the NAK is more than the second reference value.

20. The method of claim 19, wherein the step of determining if the power level of the second signal is to be controlled, further comprises:
- maintaining the power level of the second signal when the count of the ACK is less than or equal to the first reference value or when the count of the NAK is less than or equal to the second reference value.

21. A Bluetooth device, comprising:
- a control section for connecting a local Bluetooth device to a remote Bluetooth device via a link, for disconnecting the link between the local and remote Bluetooth devices, and for controlling the local Bluetooth device;
- a baseband processing section for generating a data packet to transform the data packet into a baseband signal;
- a transmitting-and-receiving section for transducing the baseband signal to a first signal having a frequency band to output the first signal, for receiving a second signal from the remote Bluetooth device and transducing the second signal to a third signal having a baseband frequency to transmit the third signal to the baseband processing section; and
- a power control section for determining a condition of a wireless link linked to the remote Bluetooth device to control a power level of the first signal based on the condition of the wireless link,
- wherein the power control section receives the second signal from the remote Bluetooth device, compares a power level of the second signal with a reference power level to determine if the remote Bluetooth device provides a request to control the power level of the second signal;
- determines if a power level of the first signal is to be controlled based on a condition of the wireless link when the remote Bluetooth device does not provide the request to control the power level of the second signal; and
- controls the power level of the first signal for transmitting the first signal to the remote Bluetooth device.

22. The Bluetooth device of claim 21 wherein the power control section determines the condition of the wireless link using an ARQN bit in a Bluetooth baseband packet header, wherein the ARQN bit represents a positive acknowledge (ACK) or a negative acknowledge (NAK).

23. The Bluetooth device of claim 22, wherein the power level of the first signal is determined based on the condition of the wireless link through a baseband layer.

24. The Bluetooth device of claim 22, wherein the power level of the first signal is determined based on the condition of the wireless link through a link managing layer.

* * * * *